Patented Apr. 26, 1949

2,468,207

UNITED STATES PATENT OFFICE 2,468,207

TREATMENT OF STARCH

Ralph Waldo Kerr, Riverside, Ill., assignor to Corn Products Refining Company, New York, N. Y., a corporation of New Jersey No Drawing. Application July 18, 1945, Serial No. 605,647

7 Claims. (Cl. 127—32)

This invention relates to a novel starch product and to the process for preparing the same.

An object of the invention is to prepare a gelatinized starch product which has far greater colloidal stability with respect to physical stresses, chemical reagents and the like, than starch products heretofore known. Another object of the invention is to produce a starch product which has a very high paste viscosity and is readily dispersible in water. A further object is to provide a process for making a starch product having the aforementioned properties.

The principal industrial uses of starch depend upon its property of gelatinizing in aqueous media to form a paste, sol, or gel. Many of these uses of starch depend upon the colloidal characteristics of such pastes. Viscosity is an index of the colloidal characteristics of a starch paste. The term viscosity is used herein as it is used in the starch industry generally and is intended to have the same meaning.

Starch pastes obtained from native starch are relatively unstable in a colloidal sense. During the preparation of a starch paste, the viscosity thereof increases until a maximal value is reached. However, continuous agitation, pressure, or high temperature, as encountered in the course of utilizing the paste, cause progressive degeneration of its colloidal properties and, as a result, a rapid decrease in its viscosity. These effects are materially increased in the presence of electrolytes, and, more particularly, in the presence of alkaline agents.

In many applications of starch, it is necessary to use the starch paste under alkaline conditions. However, the inherent instability of starch in alkaline media has seriously limited its use for such applications. It will be appreciated, therefore, that a starch product which is unusually stable, colloidally, in alkaline media, particularly a starch product which has a high paste viscosity, is very desirable.

I have now found a method for producing a starch product which is colloidally stable in the presence of alkaline agents and is also readily dispersible in water and has a very high paste viscosity. In general my process comprises gelatinizing starch or starch products in the presence of a small amount of sodium stannate or potassium stannate.

When starch is gelatinized in the presence of a small amount of sodium stannate, the paste differs considerably from starch pastes made in the usual way. The paste made in the presence of such salt is quite transparent, indicating a high degree of dispersibility of the colloidal constituents, and the viscosity of the paste, either in hot or cold state, attains an extremely high value. Such paste maintains a significantly higher level of viscosity, even at a relatively high pH value, when it is heated, agitated, pumped under pressure and the like, than does a paste obtained from starch not gelatinized in accordance with the invention.

When starch is gelatinized in the presence of potassium stannate, a paste having characteristics similar to that above described is produced although the differences between the former and the usual starch pastes are less pronounced, particularly as concerns the hot paste viscosity index.

In carrying out the process of my invention, the gelatinization of the starch in the presence of small amounts of sodium stannate or potassium stannate may be effected by any of the usual means for gelatinizing starch. Thus a mixture of starch, sodium stannate or potassium stannate, and water may simply be heated until gelatinization of the starch occurs. Or such mixture may be passed over heated rolls in accordance with the method generally disclosed in U. S. Patent No. 1,979,257, issued November 6, 1934.

The amount of sodium stannate which is necessary to produce the desired effect upon starch, in practising my invention, is of the order of about 0.5%, based upon the dry weight of the starch. Amounts of sodium stannate considerably larger than 0.5% may also be used, but for practical reasons it is preferable to use not more than about 10% of sodium stannate, based upon the dry weight of the starch.

The amount of potassium stannate required to produce starch pastes possessing the desired characteristics is of the order of about 5.0%, based upon the dry weight of the starch. Larger amounts of potassium stannate may be used but for practical reasons it is preferable not to use more than about 10% of potassium stannate, based upon the dry weight of the starch.

In view of the greater efficacy of sodium stannate, as compared with potassium stannate, and, also, in view of the lower cost of sodium stannate, the latter is the preferred agent.

Sodium and potassium stannates are sometimes also referred to as sodium and potassium metastannates. The terms sodium stannate and potassium stannate as used herein are intended to mean the tin salts responding respectively to the formulas $Na_2SnO_3 \cdot 3H_2O$ and $K_2SnO_3 \cdot 3H_2O$. The usual grades available commercially are satisfactory. Mixtures of these stannates may also be used.

The starch may be gelatinized in the presence of sodium stannate or potassium stannate immediately before its application, or the starch so gelatinized may be dried and stored if immediate use is not contemplated. Starch pastes prepared in the presence of sodium stannate or potassium stannate may be dehydrated by conventional methods, such as drum drying, spray drying, and the like. It has been found that the products resulting from dehydration of such starch pastes readily redisperse in water and form colloidal systems which resemble starch pastes freshly prepared in the presence of sodium stannate or potassium stannate.

The amount of water which is present during the formation of starch pastes according to my invention will be determined by the applications for which they are intended; the same considerations which apply to gelatinization of starch in general, are applicable in practising the present invention.

The process of my invention and the principles thereof are applicable to all types of native starches, e. g., corn starch, tapioca starch, potato starch, waxy maize starch, and the like; and to dextrins produced in the usual commercial manner from native starch.

There are various methods commonly employed for determining the viscosities of hot and cold starch pastes. The method preferred for determining the viscosity of hot pastes produced according to this invention is the Scott method, and that preferred for the determination of cold paste viscosity is the Stormer method. These will now be described.

*Scott method.*—9 grams commercial basis (i. e. including water) of 12% moisture starch is mixed with 280 cc. of distilled water at room temperature. The German silver beaker containing the mixture is put into a boiling water bath and stirred constantly for five minutes by means of a mechanical agitator rotating at 200 revolutions per minute. At the end of five minutes the beaker is covered with a watch glass and the contents heated for another period of five minutes. At the end of ten minutes the watch glass is removed, the condensate is drained back and the material stirred at the above rate, the draining and stirring taking ten seconds. The watch glass is put back on the beaker and the mixture heated for one minute and fifty seconds or until twelve minutes time has elapsed. The watch glass is removed, the condensate is drained back into the beaker and contents stirred, these operations taking fifteen seconds. At the end of twelve minutes and fifteen seconds, elapsed time, the contents of the beaker is transferred to a Scott cup also in the boiling water bath, such cup being described below, and at the end of fifteen minutes, total elapsed time, the plunger valve of the cup is withdrawn, allowing the paste to pass into a graduated cylinder arranged below the cup. The Scott index for any given paste is the number of seconds required for the delivery of 50 cc. of the starch paste from the cup. The Scott cup is a cup or funnel having a stainless-steel cylindrical tube extending from the bottom. The internal diameter of the tube is 0.1168 inch and the length is 0.495 inch. This tube is screwed into the bottom of the Scott cup. A master cup is maintained for the purpose of standardizing other cups, using standard starch samples. These starch samples have their Scott values determined in the master Scott cup as above described. Portions of these same samples are then tested for Scott value with the Scott cup under test. The latter apparatus should check within 2 to 3 points of Scott against the Scott value of the sample determined by the master cup, and any necessary adjustments of the cup under test are made to this end.

The amount of starch used in determining Scott viscosity may be varied, according to the viscosity of the starch paste, higher viscosities requiring less starch and lower viscosities requiring more starch.

*Stormer method.*—This test is made by cooking 9 grams, commercial basis, of 12% moisture starch with 280 grams of water under the same standard cooking conditions as described for the Scott test. The only difference is that instead of transferring the paste contents of the beaker at the end of 12 minutes and 15 seconds to a Scott cup, the heating in the water bath is continued until the total elapsed time is 15 minutes. At this point the cooked paste is transferred to a covered glass beaker and the beaker immersed in a water bath whose water is maintained at 25° C. by means of thermostatic control. The beaker with the paste contents is allowed to stand for 3 hours in the 25° C. water bath. The cooled paste is then poured into the Stormer cup until the cup is full. The Stormer cold paste viscosity is then determined by the number of seconds that it requires for the Stormer cylinder which weighs 55 grams and has a diameter of 31.75 millimeters and a length of 34.93 millimeters to make 50 revolutions within the paste, when the cylinder is forced to rotate by a 400 gram weight.

As in the Scott test the amount of starch used to make the test may be varied. Similarly the weight on the cylinder may be varied, higher viscosities requiring heavier weights than lower viscosities.

The following examples, which are intended as informative and typical only and not in a limiting sense, will further illustrate the invention, which is intended to be limited only in accordance with the scope of the appended claims.

*Example 1.*—This example will show the striking increase in the viscosity indexes of both hot and cold starch pastes which were prepared in the presence of increasing amounts of sodium stannate. In each case, 13 grams of starch and an amount of sodium stannate (based upon the dry weight of the starch) shown in the table, was stirred with 280 cc. of water in a Scott viscosity beaker. The beaker was then suspended in a boiling water bath and at the end of 15 minutes total elapsed time the Scott indexes were determined in accordance with the method above described.

Table I

|  | Scott Viscosity Index of 50 cc. Paste |
|---|---|
|  | Seconds |
| Corn Starch | 34 |
| Corn Starch+0.5% Sodium Stannate | 75 |
| Corn Starch+1.0% Sodium Stannate | 265 |
| Corn Starch+2.0% Sodium Stannate | 533 |

The following table shows the viscosity indexes of the above starch pastes after being cooled to 25° C. and held at this temperature for 3 hours, The viscosity indexes were determined in accordance with the Stormer test as above described, using a 400 gram weight to rotate the cylinder. The viscosity indexes are reported as the seconds required for 50 revolutions of the cylinder.

*Table II*

|  | Stormer Test Seconds/50 Revolutions |
|---|---|
| Corn Starch | 62. |
| Corn Starch+0.5% Sodium Stannate | Too thick to measure. |
| Corn Starch+1.0% Sodium Stannate | Do. |
| Corn Starch+2.0% Sodium Stannate | Do. |

*Example 2.*—This example will show the effect of potassium stannate upon starch gelatinized in its presence as compared to starch gelatinized in the presence of sodium stannate. In each case, 9 grams of native corn starch and an amount of stannate (based upon the dry weight of the starch), shown in Table III, was stirred with 280 cc. of water in a Scott viscosity cup. The cup was then suspended in a boiling water bath for 15 minutes. Immediately thereafter Scott indexes were determined.

*Table III*

|  | Scott Viscosity of 50 cc. of Paste |
|---|---|
| Control, corn starch | 16 seconds. |
| Corn starch+5% potassium stannate | 21 seconds. |
| Corn starch+5% sodium stannate | Approximately 250 seconds. |

The above pastes were cooled to 25° C. and aged at this temperature for a total of 48 hours. Table IV shows the Stormer indexes of the pastes at different aging periods. The indexes were determined with the Stormer viscosimeter in accordance with the test as above described using a 100 gram weight to rotate the cylinder. The viscosity indexes are reported as the seconds required for 50 revolutions of the cylinder.

*Table IV*

|  | Stormer Indexes | | |
|---|---|---|---|
|  | 3 hrs. | 24 hrs. | 48 hrs. |
| Control, corn starch | 12 | 21 | 40 |
| Corn starch+5% potassium stannate | 175 | 122 | 126 |
| Corn starch+5% sodium stannate | 600 | 380 | 205 |

It has long been known that when alkali is added to starch the granules tend to dissolve to form a transparent paste. The viscosity indexes of such pastes as first prepared are higher than that of a paste prepared in neutral medium. However, starch pastes prepared in the presence of alkali are fairly unstable colloidally and soon deteriorate into limpid solutions, the viscosity indexes of which are considerably lower than that of starch paste prepared in neutral medium. Although sodium stannate and potassium stannate are alkaline agents, their effect upon starch in respect of the present invention is unique and markedly different from that of alkaline agents in general as will appear from Examples 3, 4 and 5.

*Example 3.*—Thirteen grams of starch and the alkaline agent in amount shown in the table below were stirred with 280 cc. of water in a Scott viscosity cup. The cup was then suspended in a boiling water bath for 15 minutes. Immediately thereafter Scott viscosity indexes of the pastes were determined; pH values of the pastes were also determined.

*Table V*

|  | Scott Viscosity Index 50 cc. of Paste | Final pH Value of Paste |
|---|---|---|
|  | Seconds |  |
| Corn Starch | 34 | 5.0 |
| Corn Starch+0.5% Sodium Stannate | 75 | 9.0 |
| Corn Starch+1.0% Sodium Stannate | 205 | 9.4 |
| Corn Starch+2.0% Sodium Stannate | 533 | 10.2 |
| Corn Starch+0.5% Na$_2$CO$_3$ | 35.0 | 9.6 |
| Corn Starch+0.5% NaOH | 30.5 | 10.8 |
| Corn Starh+2.0% Sodium Bismuthate | 33.0 | 8.5 |

Percentages of alkaline agents are based upon the dry weight of the starch.

Table VI shows the viscosity indexes of the above starch pastes after being cooled to 25° C. and held at this temperature for 3 hours. The viscosity indexes were determined in accordance with the Stormer test as described above, using a 400 gram weight to rotate the cylinder.

*Table VI*

|  | Stormer Test Seconds/ 50 Revolutions |
|---|---|
| Corn Starch | 62. |
| Corn Starch+0.5% Sodium Stannate | Too thick to measure. |
| Corn Starch+1.0% Sodium Stannate | Do. |
| Corn Starch+2.0% Sodium Stannate | Do. |
| Corn Starch+0.5% Na$_2$CO$_3$ | 15. |
| Corn Starch+0.5% NaOH | 10. |

Each of the pastes has less body than the paste made from corn starch alone except the ones prepared in the presence of sodium stannate and these were so viscous that a reading could not be obtained.

*Example 4.*—Pastes were made in the manner described in Example 1, using 9 grams of starch, 280 cc. of water and adjuncts as indicated in Table VII. In the case where sodium hydroxide was added only enough of this adjunct was used to raise the pH value of the paste to about the same levels as obtained by the use of sodium stannate.

*Table VII*

|  | Scott Viscosity Index 50 cc. of Paste | pH value of Paste |
|---|---|---|
|  | Seconds |  |
| Corn Starch Alone | 13 | 6.4 |
| Corn Starch+0.5% Sodium Stannate | 17 | 9.3 |
| Corn Starch+1.0% Sodium Stannate | 37 | 9.8 |
| Corn Starch+2.0% Sodium Stannate | 74 | 10.3 |
| Corn Starch+5.0% Sodium Stannate (about) | 250 | 10.7 |
| Corn Starch+NaOH for pH adjustment | 19 | 11.0 |

The above example also shows the effect of increasing amounts of sodium stannate on the viscosity of starch paste.

*Example 5.*—Three samples of starch, each weighing 7 grams, were mixed with 280 cc. of water. In one case, no further additions were made, in another 0.35 gram of sodium stannate was added and in the third, a small amount of sodium hydroxide was added so as to produce in the slurry a pH value comparable to that of the slurry containing the stannate. The slurries, in metal cups, were suspended in a boiling water bath and heated while being stirred for 15 minutes. The three pastes were aged for 3 hours at 25° C. and their viscosity indexes were determined in a Stormer viscometer at 25° C. A 50 gram weight was used to rotate the cylinder, except when the stannate-starch paste was tested. In this latter case, the viscosity index using the 50 gram weight was infinity and hence a 200 gram weight was applied in order to make the determination. The results expressed in seconds for 50 revolutions of the cylinder are as follows:

*Table VIII*

|  | Stormer Test | pH Value of Paste |
| --- | --- | --- |
| Corn Starch Alone | 18 sec. (50 g. wt.) | 6.4 |
| Corn Starch+NaOH for pH adjustment | 34 sec. (50 g. wt.) | 11.0 |
| Corn Starch+5.0% Sodium Stannate | 85 sec. (200 g. wt.) | 10.7 |

*Example 6.*—This example shows the effect of sodium stannate upon dextrin. A dextrin paste was made by heating a mixture of 55 grams of a commercial dextrin and 165 cc. of water for 30 minutes on a boiling water bath. Pastes were also made as above in which varying amounts of sodium stannate were mixed with the dextrin and water before the mixture was heated. The Stormer viscosity indexes of the pastes, after being cooled to 25° C. and allowed to stand for one hour, appear in Table IX.

*Table IX*

|  | Stormer Viscosity 100 g. wt. Secs./50 Rev. |
| --- | --- |
| Dextrin alone | 7. |
| Dextrin+3.0% Sodium Stannate | 14. |
| Dextrin+3.3% Sodium Stannate | 69. |
| Dextrin+3.5% Sodium Stannate | 137. |
| Dextrin+4.0% Sodium Stannate | Too thick to measure. |

Starch pastes are frequently used for adhesive purposes, for example, for sealing the seams of paper bags. Ordinarily, in common with many other types of adhesives made from starch products, these pastes are prepared in the presence of borax, caustic alkalies such as sodium hydroxide and/or other alkaline materials. These pastes are heavy bodied and frequently require a hydrostatic head of the order of about 150 to 1000 pounds per square inch to transport them to the bag machines. This physical stress reduces the viscosity of the pastes.

The following example will show the effect of sodium stannate on commercial bag seam pastes.

*Example 7.*—Bag seam pastes were made up in accordance with a formulation in general use by bag manufacturers, as follows:

| | | |
| --- | --- | --- |
| Raw corn starch | lbs | 280 |
| Tapioca starch | lbs | 160 |
| Corn dextrin | lbs | 140 |
| Caustic soda | lbs | 2.025 |
| Water | gals | 590 |

The starches and dextrin were suspended in 420 gals. of water and heated to 180° F. Then the caustic soda was added and the gelatinized mass stirred for 30 to 60 minutes. Finally 170 gals. of cold water was added and the paste allowed to cool to 100° F.

A duplicate cook was made in which 8.4 lbs. of sodium stannate was added to the cold suspension of the starch and dextrin mixture. The mixture was heated to 150° F. instead of 180° F. as above, treatment otherwise being the same.

Very high pump pressures were required to pump these pastes up through several floors of the bag factory. Accordingly, the viscosity indexes of the pastes were measured as prepared and after being passed through a pump at 1000 lbs. per square inch pressure. The time required for the paste to pass through the pump was approximately one minute.

The paste body of these pastes was measured in the Stormer viscometer at 100° F. However, the paste containing the stannate was too thick for a 400 gram weight to rotate the cylinder. Consequently, the test was repeated using a 1000 gram weight to rotate the cylinder.

*Table X*

| Adhesive | Stormer Tests (Seconds for 50 Revolutions) | | | |
| --- | --- | --- | --- | --- |
|  | 400 g. wt. | | 1000 g. wt. | |
|  | As Made | After Pumping | As Made | After Pumping |
| No addition of stannate to formulation | 53 | 37 | 10 | 6 |
| Addition of 8.4 lbs. sodium stannate | Too thick for Testing | | 63 | 179 |

The paste prepared in the presence of sodium stannate was much more viscous as made than the one without sodium stannate. After being subjected to 1000 lbs. per square inch pump pressure the paste containing sodium stannate actually increased in viscosity. The paste which did not contain the stannate was thinner as made than the one containing sodium stannate and lost a very considerable portion of this viscosity while being subjected to the pressure treatment above specified. The above results indicate that the paste containing stannate because of its heavy body may be diluted with water at its point of utilization and the paste yield thereby increased 20%; or conversely that less starch is required to produce a paste having the desired viscosity.

One of the largest and most important uses of starch is in paper sizes in the paper industry. However, during such use, due to physical stresses such as beating, stirring, etc., the starch tends to lose its viscosity and sizing value. If the starch is modified with sodium stannate during the preparation of the size, these objectionable features are to a large extent obviated. The next example will illustrate the effect of sodium stannate on paper size prepared from starch.

*Example 8.*—Four hundred and five pounds of paper pulp (bleached spruce, dry basis) was beaten with 19,838 lbs. of water, after which 6.1 lbs. of rosin was added. The pH value of the pulp so treated was 7.5.

A starch size was prepared by cooking 8.1 lbs. of corn starch with 162 lbs. of water and including 0.161 lb. of sodium stannate. The reaction was accomplished by bringing the temperature to approximately 200° C. over a period of 15 to 30 minutes. The size was added to the pulp while the pulp was beaten after which the pH value was 7.7. Then 5.27 lbs. of alum was added which reduced the pH value of the pulp mixture to 5.1. Beating was continued, the total time being about 90 minutes. The above procedure was repeated except that 0.405 lb. of sodium stannate was added to modify the starch. Another test was made in which no sodium stannate was added to the starch. In each case the ratio of starch to pulp was the same.

Paper sheets were made in accordance with standard paper mill procedures and the sheets were tested for strength by the accepted Mullen test. The values reported for individual runs are an average of 20 determinations. The results are expressed as percent increase in Mullen test over sheets made from base pulp.

Table XI

| Nature of Size | Percent Increase in Mullen Test, Individual Runs | Av. |
|---|---|---|
| 8.1 lbs. of gelatinized starch | 5.3, 6.8, 3.9, 5.2, 4.7, 4.9 | 5.1 |
| 8.1 lbs. of starch gelatinized in presence of 0.161 lb. sodium stannate. | 8.4, 6.2, 9.3, 6.2 | 7.5 |
| 8.1 lbs. of starch gelatinized in presence of 0.405 lb. sodium stannate. | 9.5, 8.0, 10.7, 8.4 | 9.18 |

It will be seen that paper sized with starch gelatinized in the presence of sodium stannate possesses tensile strength 80% greater than that of paper sized with ordinary starch.

*Example 9.*—This example will also illustrate the effect of sodium stannate on paper size prepared from starch. However, in this example the size was added at the head-box instead of to the beater.

A size was prepared by heating a mixture of 200 lbs. of commercial pearl starch and enough water to make 800 gals. of paste until a temperature of 190° F. was reached. Immediately thereafter 3 lbs. of sodium hydroxide was added to the paste.

Another size was prepared by cooking at 190° F. a mixture of 200 lbs. of commercial pearl starch containing 2% of sodium stannate, based upon the dry weight of the starch, and enough water to make 800 gals. of paste.

Commercial runs of manifold paper were made from a mixture of bleached and unbleached spruce pulp using each of the sizes. In each case the size was added to the filtrate from the Fourdrinier wires at the head-box to the extent of 1.5% based upon the dry weight of the pulp. Sheets were made in regular commercial manner. These sheets were tested for strength by the Mullen test. The results are expressed as percent increase in Mullen test over sheets made from base pulp.

Table XII

| Nature of Size | Percent Increase in Mullen Test, Av. 5 Determinations |
|---|---|
| Pearl starch gelatinized | 4.38 |
| Pearl starch gelatinized in presence of 2% of sodium stannate | 14.5 |

It will be noted that these results indicate a striking increase in tensile strength of paper, due to the use of sodium stannate.

The fact that starch pastes prepared in the presence of sodium stannate are unusually stable with respect to physical stresses and alkaline agents makes such pastes particularly suitable for use in beater sizes, tube sizes or calender sizes.

*Example 10.*—This example shows the effect of sodium stannate upon waxy maize starch. Pastes were made according to the method of Example 1 using 7 grams of waxy maize starch in one case, and 7 grams of waxy maize starch and 2% of sodium stannate, based upon the dry weight of the starch, in the other case. The Scott indexes of the pastes as determined by the method previously described are as follows:

Table XIII

| | Scott Viscosity Index 50 cc. of Paste |
|---|---|
| | *Seconds* |
| Waxy maize starch alone | 33 |
| Waxy maize starch+2% sodium stannate | 70 |

*Example 11.*—In this example, it is shown that the principles of the present invention are applicable to starches other than native starches, e. g., starch modified by enzyme. A modified starch was prepared by treating a slurry of raw starch below the gelatinization temperature of the starch, with a diastatic enzyme until about 10% to 20% of the starch was solubilized. Thereafter, the product was filtered, washed with water to remove the solubilized portion, and finally dried. Such starch has been designated as residue starch and the process of making the same is described in applicant's copending application Serial No. 462,589, filed October 19, 1942, U. S. Patent No. 2,380,848, issued July 31, 1945.

Pastes were made from such residue starch in the manner described in Example 1, using 9 grams of starch, 280 cc. of water, and amounts of sodium stannate (based upon the dry weight of the starch) shown in Table XIV. The table also lists the Scott indexes of the various pastes so prepared.

Table XIV

| | Scott Viscosity Index of 50 cc. Paste |
|---|---|
| | *Seconds* |
| Residue starch | 17 |
| Residue starch+0.5% of sodium stannate | 20 |
| Residue starch+1% of sodium stannate | 24 |
| Residue starch+2% of sodium stannate | 48.6 |
| Residue starch+5% of sodium stannate | 230 |

Starches prepared in accordance with the present invention find utility in a wide variety of applications. For example, such starch may advantageously be used in the extraction of alumina from bauxite. Such application of starches in general is described in U. S. Patent No. 2,280,998, issued on April 28, 1942, to Brown. However, considerable degradation of the starch ordinarily occurs during the process which necessitates the use of a larger amount of the starch than would otherwise be necessary. If starch is first treated by boiling it in water to which has been added about 1% to about 10% of sodium stannate, based upon starch dry substance, before being used in the process, the stability of the starch during subsequent treatment has been found to be materially improved.

Starch is also used in drilling muds as a water retention agent to prevent water loss of the mud. Drilling muds are maintained at a very high pH value in order to keep the mud fluxed. Such muds are frequently pumped under tremendous pressures during their use. Both of these factors affect the starch adversely. The starch degenerates, and the paste loses its viscosity and water retention value. If, however, the starch is gelatinized in the presence of about 1% to about 10% of its weight of sodium stannate, based upon the dry weight of the starch, the water retention of the starch has been found to be materially stabilized with respect to the above factors.

The process of my invention is simple and economical. No special equipment is necessary as the process may be carried out by use of conventional equipment. The starch so treated affords several distinct advantages over starch products heretofore known. Due to the high degree of their stability, starch pastes prepared in accordance with the present invention require less care in handling, in their applications, than do starch pastes previously used. Furthermore, due to its improved properties, starch treated according to my invention may be used in smaller quantities and with better results than starch products heretofore known, thus affording substantial operating economies.

I claim:

1. The process of treating starch which comprises heating a mixture of the starch, water and sodium stannate to a temperature sufficient to gelatinize the starch, the sodium stannate being present in the amount of at least 0.5 percent based upon the dry weight of the starch.

2. The process of treating starch which comprises gelatinizing the starch in an aqueous medium containing sodium stannate in the amount of about 0.5 percent to about 10 percent, based upon the dry weight of the starch.

3. The process of treating starch which comprises gelatinizing the starch in an aqueous medium containing potassium stannate in the amount of at least 5 percent, based upon the dry weight of the starch.

4. The process of treating starch which comprises heating a mixture of the starch, water and a salt from the group consisting of sodium stannate and potassium stannate to a temperature sufficient to gelatinize the starch, the sodium stannate being present in the mixture to the extent of at least 0.5 percent, based upon the dry weight of the starch, and the potassium stannate being present in the mixture to the extent of at leas 5.0 percent, based upon the dry weight of the starch.

5. The process of treating starch which comprises heating an aqueous suspension of starch containing sodium stannate to a temperature of 200° F. within a period of at least about 15 to about 30 minutes, said sodium stannate being present in an amount between 0.5 and 10 percent, based upon the dry weight of the starch.

6. The process of treating starch which comprises subjecting a mixture of the starch, water and sodium stannate to momentarily applied pressure and to a starch gelatinizing temperature, while permitting free evaporation of the water, the water in the mixture, being present to the extent of about 38 to 50 percent, and the sodium stannate being present in the mixture to the extent of at least 0.5 percent, based upon the dry weight of the starch.

7. The process of treating starch which comprises gelatinizing the starch in an aqueous medium containing a mixture of sodium stannate and potassium stannate in amount at least equivalent to the effect of 0.5 percent of sodium stannate, based upon the dry weight of the starch.

RALPH WALDO KERR.

REFERENCES CITED

The following references are of record in the file of this patent:

UNITED STATES PATENTS

| Number | Name | Date |
|---|---|---|
| 1,630,365 | Weber | May 31, 1927 |
| 2,181,782 | Coppock | Nov. 28, 1939 |
| 2,214,018 | Gill | Sept. 10, 1940 |
| 2,280,998 | Brown | Apr. 28, 1942 |
| 2,386,509 | Schochk | Oct. 9, 1945 |
| 2,399,986 | Chapman | May 7, 1946 |

FOREIGN PATENTS

| Number | Country | Date |
|---|---|---|
| 414,979 | Germany | June 12, 1925 |